United States Patent [19]

Barnes, Jr.

[11] 4,424,435
[45] Jan. 3, 1984

[54] LOW EXPANSION LASER WELDING ARRANGEMENT

[75] Inventor: William P. Barnes, Jr., Acton, Mass.

[73] Assignee: Itek Corporation, Lexington, Mass.

[21] Appl. No.: 301,266

[22] Filed: Sep. 11, 1981

[51] Int. Cl.³ ............................................. B23K 27/00
[52] U.S. Cl. ...................... 219/121 LD; 219/121 LR
[58] Field of Search ................. 219/121 LC, 121 LD, 219/121 LR, 85 BA, 85 BM; 65/43

[56] References Cited

U.S. PATENT DOCUMENTS

| | | | |
|---|---|---|---|
| 3,210,171 | 10/1965 | MacDonald | 65/43 |
| 3,424,890 | 1/1969 | Van Ruyven | 219/121 LD |
| 3,679,862 | 7/1972 | Stoll et al. | 219/121 EM |
| 3,734,702 | 5/1973 | Veres | 65/43 |
| 3,742,181 | 7/1973 | Costello | 219/85 BA |
| 3,848,104 | 11/1974 | Locke | 219/121 L |
| 3,881,904 | 5/1975 | Stokes et al. | 65/43 |
| 3,934,073 | 1/1976 | Ardezzone | 219/121 LC X |
| 3,966,449 | 6/1976 | Foster et al. | 65/43 |
| 3,974,016 | 8/1976 | Bondybey et al. | 219/121 LM |
| 4,023,005 | 5/1977 | Bolin | 219/121 LD |

FOREIGN PATENT DOCUMENTS

| | | | |
|---|---|---|---|
| 41-12331 | 7/1966 | Japan | 65/43 |
| 52-30248 | 7/1977 | Japan | 219/121 LC |
| 55-74147 | 6/1980 | Japan | 219/85 BM |

Primary Examiner—C. L. Albritton
Attorney, Agent, or Firm—Homer O. Blair; Robert L. Nathans; Gerald H. Glanzman

[57] ABSTRACT

An arrangement for laser beam welding wherein at least one of the components being welded is formed of a material which is substantially transparent to radiation at the wavelength of the laser welding beam. A layer of welding material is placed over the surface area of the weld joint, and is a type of material which is substantially absorbent of radiation at the wavelength of the laser welding beam. The welding material is then irradiated by the laser beam through the component which is substantially transparent thereto for a sufficient period of time to cause melting of the welding material and fusion thereof to the two components being welded. The present invention has particular applicability to welding with a Nd-YAG laser of components formed of silica-containing material, such as fused silica or titanium silicate, and wherein the welding material placed at the weld surface area is a titanium based material. The present invention is also particularly attractive for weld locations which are physically inaccessible to direct irradiation, but can be irradiated through the material which is substantially transparent to the laser welding beam.

9 Claims, 1 Drawing Figure

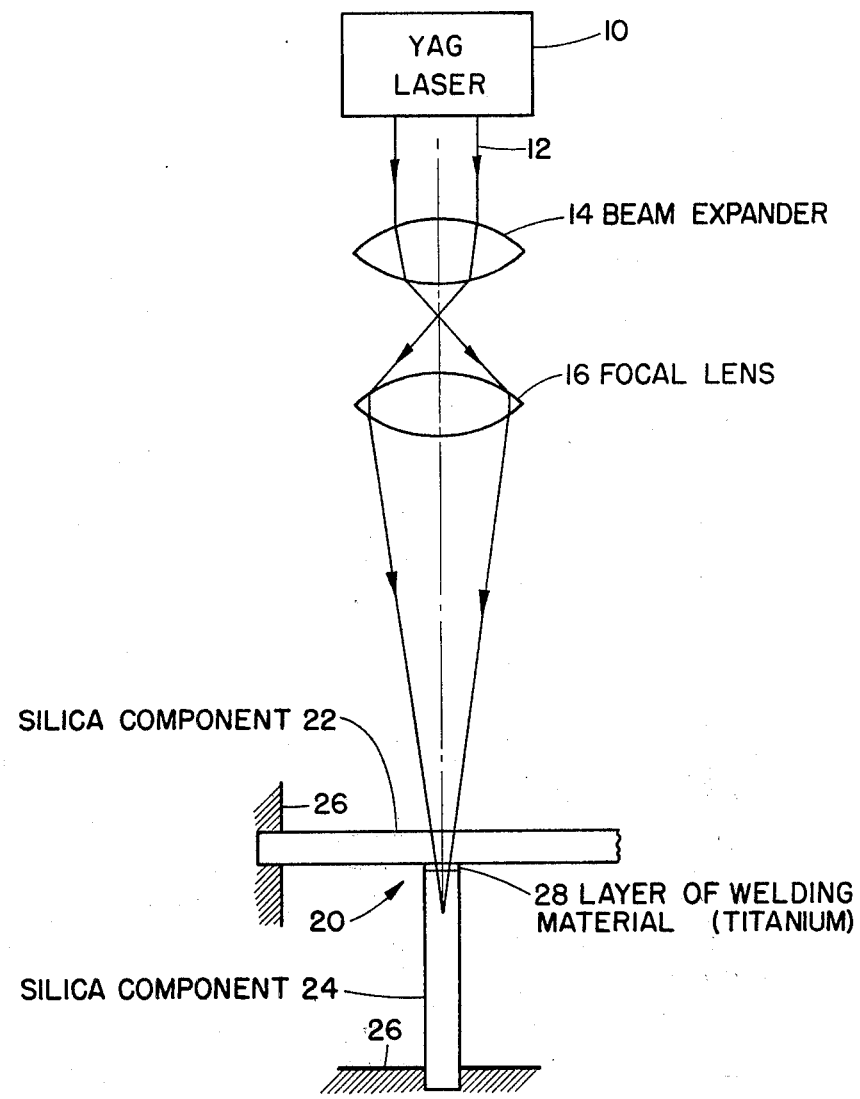

LOW EXPANSION LASER WELDING ARRANGEMENT

BACKGROUND OF THE INVENTION

1. Field of the Invention

The present invention relates generally to a welding arrangement for selected types of material, such as silica based materials, and more particularly pertains to a low expansion welding arrangement having particular applicability to normally inaccessible welding locations.

2. Discussion of the Prior Art

Laser welding arrangements of the prior art have employed carbon dioxide lasers for welding a large variety of materials including low expansion glasses such as fused silica and Ultra Low Expansion (ULE-ULE is a trademark of Corning Glass Works for their code 7971 titanium silicate glass) titanium silicate materials. However, the 10.6 um wavelength laser beam generated by a carbon dioxide laser is substantially entirely absorbed very close to the external surface of the weld area, and penetration of fusion at the weld joint is dependent primarily on conductive heat transfer into the glass.

The only other type of laser available in the present state of the art with a sufficient flux density for practical welding applications is a continuous wave or high duty cycle pulsed neodymium (Nd)-Yttrium Aluminum Garnet (YAG) laser which operates at a 1.06 um wavelength. Fused silica and ULE titanium silicate are highly transparent at this wavelength, however, and only absorb enough energy to cause a slight warming. Carbon dioxide and Nd-YAG lasers are currently commercially available with beam powers of 100 to 1000 watts which are generally sufficient for the laser beam welding.

Mirror substrates having a monolithic core structure of ULE titanium silicate have also been fabricated in the prior art by employing gas welding techniques as ULE titanium silicate material is generally amenable to the large thermal gradients imposed by gas welding.

Van Ruyven U.S. Pat. No. 3,424,890 is of interest to the present invention, and discloses a method for bonding together first and second different semiconductor materials, each of which has a different absorption constant for an electromagnetic radiation beam generated by a laser. The radiation is directed through the material with the lower absorption constant to the interface of the materials, at which the simiconductor material with the higher absorption constant absorbs the radiation in the immediate vicinity of the interface. This results in a rise of temperature and pressure thereat, and/or strong local electromagnetic fields which establish the desired bonding and connection. This reference is similar to the present invention to the extent that it involves selective absorption at an internal discontinuity, but is quite different from the present invention in which similar materials may be welded through the utilization of a selective welding material at the bonding joint.

Stoll, et al. U.S. Pat. No. 3,679,862 discloses a process for welding metal components across a contact area at which a space is formed between the components. Corpuscular radiation, such as in an electron beam, is directed at the contact area, the space of which is filled with a metal tube highly absorptive of the electron beam. The electron beam is absorbed by and melts the metal tube to form the weld joint. Although this reference is similar to the present invention to the extent that it involves selective absorption at an internal discontinuity, it is also quite different in that the major emphasis in this patent is directed towards welding of metal components with corpuscular radiation, such as in electron beam welding which is acknowledged to be old in the art. Although this reference mentions other types of usable corpuscular radiation such as neutrons or photons, that disclosure must be taken within the context of the overall teaching of this patent which is clearly limited to welding of metal components.

Bolin U.S. Pat. No. 4,023,005 is also somewhat relevant to the present invention to the extent that it discloses a laser beam welding arrangement for highly reflective materials. The highly reflective materials are clad in the area of the weld joint with a low reflective material. A pulsed or continuous laser beam is then directed onto the clad area of the weld joint such that the low reflective material is melted to form a weld joint which is integrally bonded with the highly reflective material. This reference is believed to be pertinent to the present invention to the extent that it discloses a laser beam welding arrangement wherein a low reflective material is utilized to absorb the laser beam, but is quite different conceptually from the present invention which allows laser beam welding in the otherwise inaccessible areas and also places a weld material in the weld joint.

SUMMARY OF THE INVENTION

Accordingly, it is a primary object of the present invention to provide a welding arrangement which is particularly suitable for silica based materials such as fused silica and ULE titanium silicate.

A further object of the subject invention is the provision of a welding arrangement of the aforementioned type which provides a low expansion welding method having particular applicability to normally inaccessible welding locations.

In accordance with the teachings herein, the present invention provides an arrangement for laser beam welding of two components wherein at least one of the components is formed of a material which is substantially transparent to radiation at the wavelength of the laser welding beam. A layer of welding material is placed over the surface area of the weld joint, and is a type of material which is substantially absorbent of radiation at the wavelength of the laser welding beam. The welding material is then irradiated by the laser beam through the component which is substantially transparent thereto for a sufficient period of time to cause melting of the welding material and fusion thereof to the two components being welded.

The present invention has particular applicability to welding with a Nd-YAG laser of components formed of silica-containing material, such as fused silica or ULE titanium silicate, and wherein the welding material placed at the weld surface area is a titanium based material. Titanium is a particularly attractive welding material as it is already constituent of ULE material, has a melting point comparable to silicon dioxide, a higher point than silicon dioxide, and should absorb approximately 50% of a YAG laser beam in a film only 130 Å thick.

The present invention is also particularly attractive for weld locations which are physically inaccessible to direct irradiation, but can be irradiated through the material which is substantially transparent to the laser welding beam.

Moreover, a laser welding arrangement pursuant to the present invention should have an advantage over gas welding processes for lightweight mirrors constructed with lightweight, low thermal expansion glassy mirror materials because a laser can deliver a well defined energy flux to a precisely defined area or volume of the workpiece. Additionally flexibilities also exist in tailoring the geometrical distribution of the laser beam (as by beam expanders, anamorphic lenses, and mode selection and apodization of the laser beam) and by controlling the welding beam position. These flexibilities provide a tool that can be easily adapted to many requirements, including gentle heating of a rather large volume, fusion welding of relatively thick materials, and rapid evaporation of quite localized volumes.

In accordance with the teachings of one embodiment of the present invention, a laser beam absorbing welding material is placed at a welding joint on one or both of a pair of silica-containing components which are to be fusedly welded together. The welding material should be compatible with $SiO_2$ in both the solid and liquid states, and advantageously be capable of diffusion into and partial reduction by the silicon oxide. Most metals have fairly high reflectivities at 1.06 um and are thus not effective absorbers of energy. However, titanium is somewhat of an exception, and calculations show that even a 20 to 40% transmitting thin film of titanium should absorb approximately 50% of orthogonally incident energy at 1.06 um. Accordingly, the present invention teaches the coating, as by vacuum deposition or another process, of one or both mating surfaces of a low expansion glass where a fusion bond is desired, with a thin layer of titanium metal to absorb laser energy at 1.06 um, or other wavelengths, at which the glass itself is highly transparent. The advantages of precisely controlling the location of energy deposition, including possible applications in areas which are not readily accessible in some particular proposed assemblies, should be readily apparent to those who are familiar with existing techniques of lightweight mirror construction. Other potential applications of the teachings herein extend to alternative uses of low expansion glass configurations such as in chemical glassware, etc.

BRIEF DESCRIPTION OF THE DRAWINGS

The foregoing objects and advantages of the present invention for a low expansion laser welding arrangement may be more readily understood by one skilled in the art with reference being had to the following detailed description of one preferred embodiment, taken in conjunction with the accompanying drawing which is a schematic arrangement of an exemplary embodiment of a laser welding arrangement constructed pursuant to the teachings of the present invention.

DETAILED DESCRIPTION OF THE DRAWINGS

Referring to the drawing in detail, a neodymium-YAG laser 10 produces a collimated and coherent radiation beam 12 which is incident on a diverging beam expander optical lens 14. The lens 14 expands the laser beam and directs it onto a focusing optical system 16 which focuses the beam to a focal point 18 just beyond a weld joint 20 to be formed between two components 22 and 24. In the illustrated embodiment components 22 and 24 are held in a T joint position in which they are to be welded by fixtures 26 which may be constructed of graphite. Experiments with the present invention also indicate that compressive pressure at the welding joint sometimes improves the resultant weld, and accordingly fixtures 26 may be designed to apply this pressure.

This embodiment also illustrates one very advantageous feature of the present invention in that the weld joint to be formed is relatively inaccessible (from above) to direct irradiation, but can be irradiated through the material of component 22. The formation of weld joints in relatively inaccessible locations should have applications in many different technological areas such as in the construction of mirror substrates having a lightweight monolithic core structure of a silica-based material.

In the T joint position, the focused laser beam is directed through the width of the first component 22 which is formed of a material selected to be substantially transparent to radiation at 1.06 um, the operational wavelength of YAG laser 10. The laser beam is focused by lens 16 to a focal joint just beyond the weld joint, and in one embodiment was selected to have a minimum beam spot size between 0.015 and 0.020 inches at the weld joint.

A layer of welding material 28 is placed over the surface area of the weld joint, and is selected to be a material such as titanium which is absorbent of radiation of the 1.06 um wavelength of the laser beam. The thickness of layer 28 is important, and successful results have been achieved with an evaporated titanium metal film having a thickness approximately two times the thickness of a visually "just opaque" film. This is a film thickness of approximately 1200 Å, with "just opaque" corresponding to 1% transmittance. The welding material can be applied as a layer to one or both of the components 22, 24, or can be placed over the surface area of the weld joint in some alternative fashion. In alternative embodiments the welding material could also be a titanium metal powder, having for instance a 1 to 5 um particle size, which is applied as a slurry with a colloidal silica such, as DuPont Ludox by, painting or silk screening.

In several embodiments herein in which the components 22 and 24 are formed of $SiO_2$, the welding material 28 should be compatible with $SiO_2$ in both the solid and liquid states, and advantageously be capable of diffusion into and partial reduction by the silicon oxide. Most metals have fairly high reflectivities at 1.06 um and thus are not effective absorbers of energy. However, titanium is somewhat of an exception, and calculations show that even a 20 to 40% transmitting thin film of titanium only 180 Å thick should absorb approximately 50% of orthogonally incident energy at 1.06 um. Moreover, titanium has a melting temperature comparable to silicon dioxide and a higher boiling point than that material.

Although titanium is highly preferred in several disclosed embodiments, other welding material candidates which might be suitable in alternative embodiments include silicon carbide, beryllium, cobalt, germanium, iron, molybdenum, nickel, niobium, platinum, rhenium, rhodium, tantalum, and tungsten.

The component 22 is selected to be highly transmissive to radiation at the operational wavelength of the laser 10. With a YAG laser operating at 1.06 um, silica-containing materials such as fused silica or titanium silicate are very good candidates. Moreover, in many welding applications the materials to be welded together are identical or similar, and accordingly component 24 is often formed of the same material as component 22, although this does not appear to be critical to the present invention. In this regard, it has been observed in the context of one embodiment that a major portion of the energy of the laser beam is absorbed on the side of the film of welding material on which the laser beam is incident. In this embodiment the reflectance of the film was also approximately 50%.

The laser 10 is preferably operated in a continuous mode, although pulsed modes, for instance having a pulse repetition rate of between 100 and 200 pulses per second, are also suitable for laser beam generation. However, some experiments with pulsed Nd-YAG lasers have resulted in some nonlinear effects at the weld joint which are not entirely understood.

Another advantageous feature of the present invention is that in some cases the weld joints can be formed without heating the entire assembly being welded to an elevated temperature.

It appears that in many applications of the present invention involving a relatively wide weld joint, that several adjacent weld beads can be advantageously employed by relatively moving the laser welding apparatus and the workpiece along a series of adjacent parallel lines, each of which forms a separate weld bead.

While several embodiments and variations of a unique laser beam welding arrangement have been described in detail herein, it should be apparent that the teachings and disclosure of the present invention will suggest many other embodiments and variations to those skilled in this art. For instance, although the drawing illustrates a T welding configuration, other types of arrangements of the welding components are clearly contemplated within the teachings of the present invention.

What is claimed is:

1. A method of laser beam welding of two components, comprising the steps of:
   a. selecting the material of at least one of the two components to be welded to be substantially transparent to radiation at the wavelength of the laser welding beam;
   b. placing over the surface area of the weld joint a layer of welding material which is substantially absorbent of radiation at the wavelength of the laser welding beam;
   c. positioning the two components in the positions at which they are to be welded with the layer of welding material therebetween; and
   d. irradiating the welding material with the laser welding beam, through the component constructed of a material which is substantially transparent thereto, for a sufficient period of time to cause melting of the welding material and fusion thereof to the two components being welded.

2. A method of laser beam welding as claimed in claim 1, wherein said step of selecting includes the step of selecting both of said two components to be formed of silica-containing material.

3. A method of laser beam welding as claimed in claim 2, wherein said step of selecting includes the step of selecting both of said two components to be formed of fused silica.

4. A method of laser beam welding as claimed in claim 2, wherein said step of selecting includes the step of selecting both of said two components to be formed of titanium silicate.

5. A method of laser beam welding as claimed in claim 1 or 2 or 3 or 4, wherein said step of irradiating includes the step of irradiating the welding material with a laser welding beam produced by a YAG laser.

6. A method of laser beam welding as claimed in claim 5, wherein said step of placing includes the step of coating a layer of welding material onto the surface area to be welded of at least one of the two surfaces.

7. A method of laser beam welding as claimed in claim 5, wherein said step of placing includes the step of placing a layer of titanium welding material over the surface area to be welded.

8. A method of laser beam welding as claimed in claims 1 or 2 or 3 or 4, wherein said step of positioning includes the step of positioning the two surfaces at their weld location in a location which is physically inaccessible to direct irradiation, but can be irradiated through the material which is substantially transparent to the laser welding beam.

9. A method of laser beam welding as claimed in claims 1 or 2 or 3 or 4, wherein said step of irradiating includes the step of irradiating the welding material by focusing the laser beam to an area beyond the welding material.

* * * * *